United States Patent [19]
Heinz et al.

[11] Patent Number: 6,073,959
[45] Date of Patent: Jun. 13, 2000

[54] SIDE IMPACT GAS BAG WITH INTERNAL RESTRAINT AND METHOD OF MAKING SAME

[75] Inventors: Martin Heinz, Stuttgart; Fred Trick, Rutesheim, both of Germany

[73] Assignee: Dr. Ing. h.c.F. Porsche AG, Weissach, Germany

[21] Appl. No.: 09/080,252

[22] Filed: May 18, 1998

[30] Foreign Application Priority Data

May 16, 1997 [DE] Germany ............................ 197 20 588

[51] Int. Cl.⁷ .................................................. B60R 21/24
[52] U.S. Cl. .................... 280/729; 280/730.2; 280/743.2
[58] Field of Search ............................... 280/729, 730.2, 280/743.2, 743.1, 728.2, 730.1

[56] References Cited

U.S. PATENT DOCUMENTS

| | | | |
|---|---|---|---|
| 4,153,273 | 5/1979 | Risko | 280/740 |
| 5,129,675 | 7/1992 | Wang | 280/743.1 |
| 5,149,130 | 9/1992 | Wooley et al. | 280/743 |
| 5,174,601 | 12/1992 | Frantz et al. | 280/740 |
| 5,205,584 | 4/1993 | Honda | 280/743 |
| 5,249,825 | 10/1993 | Gordon et al. | 280/743 |
| 5,310,214 | 5/1994 | Cuevas | 280/729 |
| 5,421,610 | 6/1995 | Kavanaugh et al. | 280/743.1 |
| 5,586,782 | 12/1996 | Zimmerman, II et al. | 280/730.2 |

FOREIGN PATENT DOCUMENTS

| | | |
|---|---|---|
| 0 586 131 | 3/1994 | European Pat. Off. . |
| 0 829 395 | 3/1998 | European Pat. Off. . |
| 2 333 888 | 1/1974 | Germany . |
| 27 22 551 | 11/1978 | Germany . |
| 39 10 007 | 10/1990 | Germany . |
| 41 42 326 | 6/1993 | Germany . |
| 43 05 050 | 9/1993 | Germany . |
| 43 15 142 | 11/1994 | Germany . |
| 44 42 433 | 6/1995 | Germany . |
| 44 30 412 | 10/1995 | Germany . |
| 44 23 552 | 1/1996 | Germany . |
| 295 17 372 | 3/1996 | Germany . |
| 43 34 606 | 4/1996 | Germany . |
| 44 43 027 | 6/1996 | Germany . |
| 297 01 337 | 4/1997 | Germany . |
| 3-67749 | 3/1991 | Japan ................................ 280/730.1 |
| 4-310449 | 11/1992 | Japan ................................ 280/743.2 |
| 6-72267 | 3/1994 | Japan ................................ 280/743.2 |

*Primary Examiner*—Peter C. English
*Attorney, Agent, or Firm*—Evenson, McKeown, Edwards & Lenahan, P.L.L.C.

[57] ABSTRACT

An impact protection device for an occupant of a vehicle includes a gas bag inflatable by a gas generator, with a restraint being provided inside the gas bag. In order to simplify installation costs for the gas bag, gas generator, and restraint, provision is made such that one end of the restraint is connected with the gas generator and the other end is connected with the fabric layer of the gas bag that faces the occupant.

15 Claims, 6 Drawing Sheets

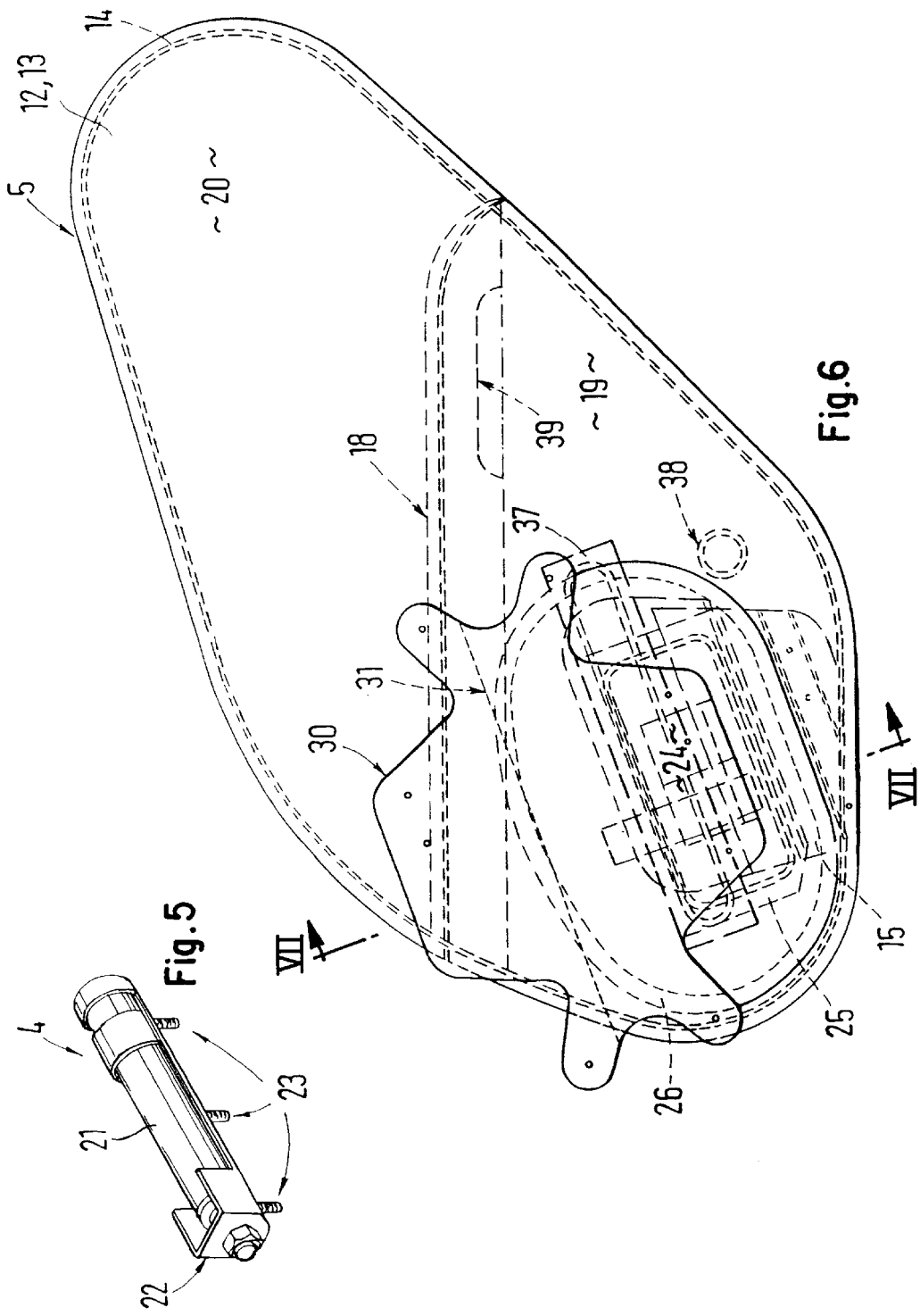

SIDE IMPACT GAS BAG WITH INTERNAL RESTRAINT AND METHOD OF MAKING SAME

BACKGROUND AND SUMMARY OF THE INVENTION

This application claims the priority of German application 197 20 588.7, filed in Germany on May 16, 1997, the disclosure of which is expressly incorporated by reference herein.

The invention relates to an impact protection device for an occupant of a vehicle in the form of a gas bag inflatable by a gas generator, said bag being provided with at least one internal restraint.

German patent document DE 41 42 326 A1 teaches a gas bag for an impact-protection device, said bag being filled by a gas generator, with the shape when filled being controlled by at least one restraint that connects two wall sections inside the gas bag. The disadvantage of this arrangement is that the restraint is connected with two wall sections of the gas bag that are spaced apart from one another and also that separate fastening of the gas generator and gas bag is provided, necessitating a higher installation cost.

A goal of the invention is to improve a gas bag with an internal restraint and a gas generator such that the installation of the gas bag, gas generator, and restraint is simplified.

This and other goals have been achieved according to the present invention by providing an impact protection device for an occupant of a vehicle, comprising: a gas bag including a first fabric layer which will face the occupant in an installed position; a gas generator communicating with said gas bag; and an internal restraint provided within said gas bag, a first end of the restraint being coupled with said first fabric layer, and a second end of the restraint being fixed proximate the gas generator.

This and other goals have been achieved according to the present invention by providing an impact protection device for an occupant of a vehicle, comprising: a housing; a gas bag; a gas generator arranged within said gas bag; and an internal restraint provided within said gas bag, a first end of the restraint being attached to a portion of the gas bag which will face the occupant of the vehicle in an installed position, and said gas generator, a second end of said restraint, and said gas bag all being coupled to said housing via at least one common connector.

This and other goals have been achieved according to the present invention by providing a method of making a vehicle impact protection device having a housing, a gas bag with an internal restraint, and a gas generator, said method comprising: inserting the internal restraint and the gas generator into the gas bag; coupling a first end of the restraint to a layer of the gas bag which will face the occupant of the vehicle in an installed position; and coupling said gas generator, a second end of said restraint, and said gas bag to said housing via at least one common connector.

The primary advantages achieved by the invention are that an additional fastening for the restraint is eliminated by connecting one end of the restraint to the gas generator, so that the installation cost is reduced. Preferably, a restraining device of this kind is provided on a gas bag of a side impact protection device, said gas bag being divided by a partition into two chambers one on top of the other, with the restraint being provided in the first chamber that faces the thoracic and pelvic area of the occupant. An elongate tubular generator is used as the generator, said generator being located inside the first chamber of the gas bag. By providing a tear seam on the restraint, the speed and travel of the side of the gas bag facing the occupant is reduced (time limitation of the deflection during unfolding) and in addition the circumferential seam of the gas bag and the fabric are relieved of stress. The restraint, made in two parts, is covered at least in the vicinity of the tear seam on both sides by protective layers, so that a theoretical load imposed on the tear seam by the emerging gas flow from the gas generator is avoided. With a certain pressure inside the first chamber, the tear seam tears and the gas bag moves further in the direction of the occupant. Darts also ensure controlled inflation of the gas bag, with the darts releasing at a certain internal pressure. An elongate generator support is provided to secure the internal tubular generator, said generator support having locally projecting threaded bolts on the side facing away from the tubular generator. The end of the restraint on the gas generator side and the gas bag are suspended from the threaded bolts, with the threaded bolts being held in place with the adjoining housing by a screw connection.

Other objects, advantages and novel features of the present invention will become apparent from the following detailed description of the invention when considered in conjunction with the accompanying drawings.

BRIEF DESCRIPTION OF THE DRAWINGS

FIG. 5 is a perspective view of the gas generator with the generator support;

FIG. 6 is a side view of the gas bag in the non-folded position; and

DETAILED DESCRIPTION OF THE DRAWINGS

Figure 1:
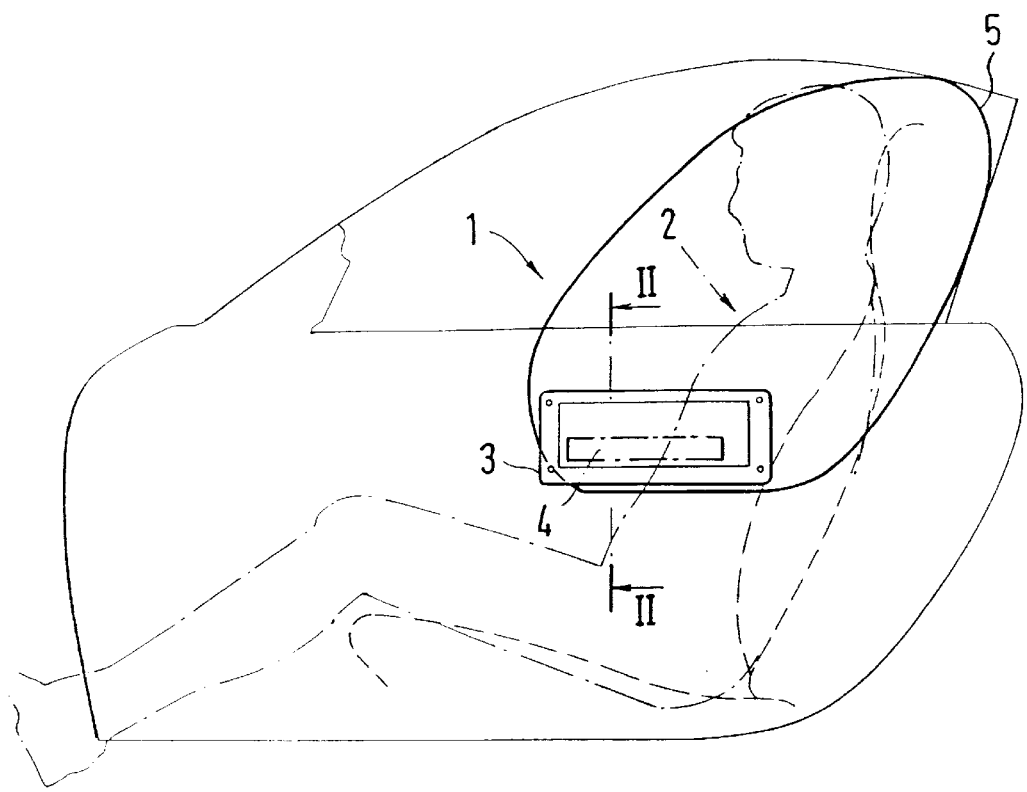
FIG. 1 is a partial side view of a side impact protection device for an occupant of a vehicle according to a preferred embodiment of the present invention.
Figure 2:
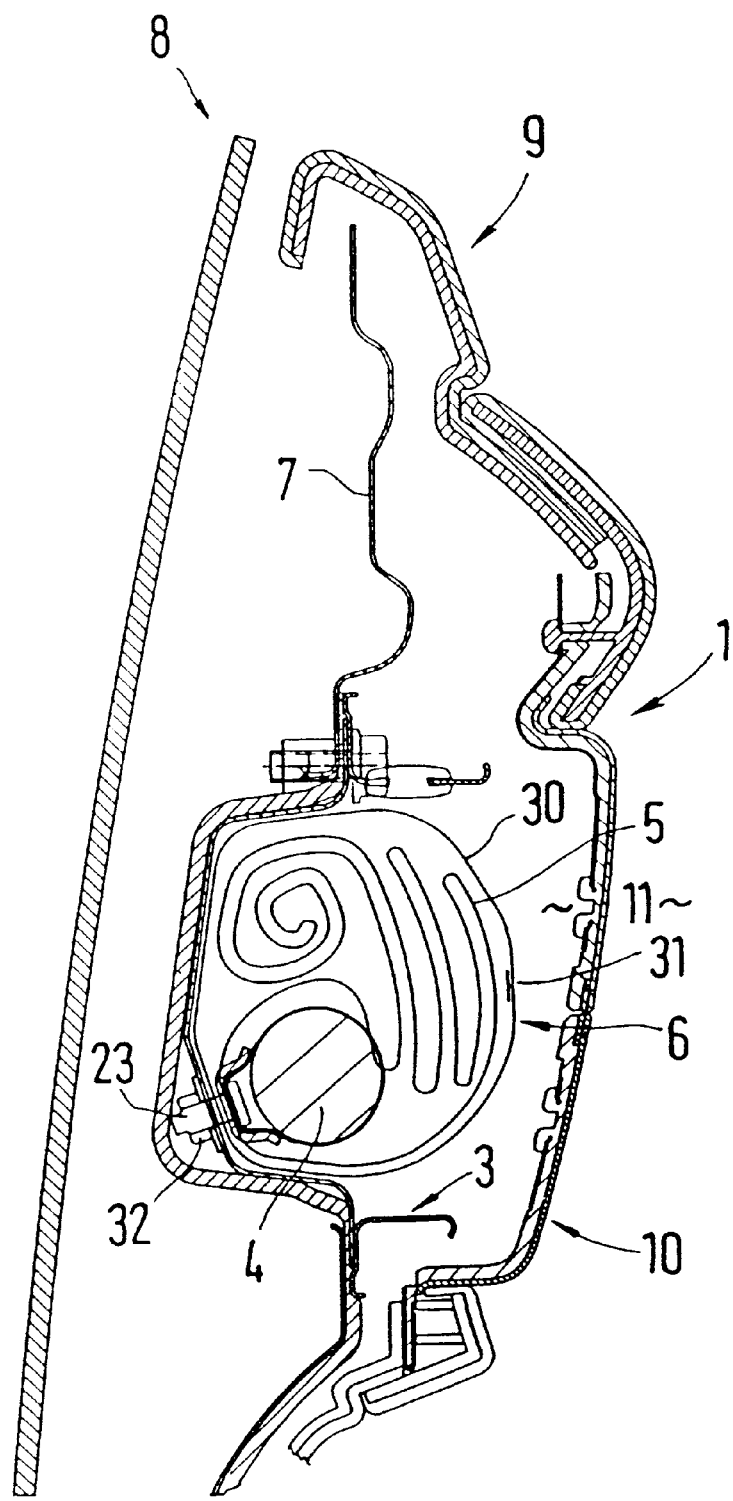
FIG. 2 is a section along line II—II in FIG. 1 in an enlarged view, with the side impact protection device assuming a lowered resting position.

An impact protection device 1 for an occupant 2 of a vehicle comprises a housing 3, a gas generator 4, and an inflatable gas bag 5, with housing 3, gas generator 4, and gas bag 5 forming a prefabricated installation module 6. In FIG. 1, the gas bag 5 is shown in the inflated operating position.

In the illustrated embodiment, impact protection device 1 is designed as a side impact protection device and the prefabricated installation module 6 is mounted on an interior panel 7 of a side door 8. A door trim 9 is located in front of installation module 6 at which trim, on a vertical wall, an outlet opening 11 closable by a cover 10 is provided for inflated gas bag 5. Cover 10 comprises two pivotable lid halves, connected with one another at a point at which tearing is to occur. Gas bag 5 consists of two fabric layers 12, 13 of approximately the same size, one on top of the other, said coverings being connected with one another edgewise by means of two circumferential seams 14, located with a short distance between them. Inside gas bag 5, at least one restraint 15 is provided which controls the shape of the gas bag during inflation thereof.

According to the invention, one end 16 of restraint 15 is connected with gas generator 4 and the other end 17 of restraint is connected with the fabric layer 13 of gas bag 5 that faces occupant 2. Gas bag 5 is divided by an internal partition 18 into two chambers 19, 20 connected with one another. In the illustrated embodiment, the two chambers 19, 20 are located one above the other with the first, bottom chamber 19 being associated with the thoracic and pelvic area of the occupant (thorax chamber).

According to FIG. 5, gas generator 4 is formed by an elongate tubular generator 21 located inside first chamber 19 and connected locally therewith. Tubular generator 21 is fastened to a generator support 22 in the axial and radial directions. On the side of generator support 22 facing away from tubular generator 21, a plurality of spaced threaded bolts 23 are mounted, said bolts serving to secure tubular generator 21 to housing 3 and also to fasten gas bag 5 and restraint 15 located inside.

In the illustrated embodiment, three spaced threaded bolts 23 are provided. Tubular generator 21 together with generator support 22 is introduced through a rectangular installation opening 24 of fabric layer 12 into the interior of gas bag 5 and then the end of the internal restraint 15 on the gas generator side 16 is hung from the three threaded bolts 23. For this purpose, suitable circular holes are provided in restraint 15. To facilitate assembly, restraint 15 can be fastened by a locking seam in the vicinity of the end 16 facing the generator to fabric layer 12 (not shown in greater detail).

Figure 7:
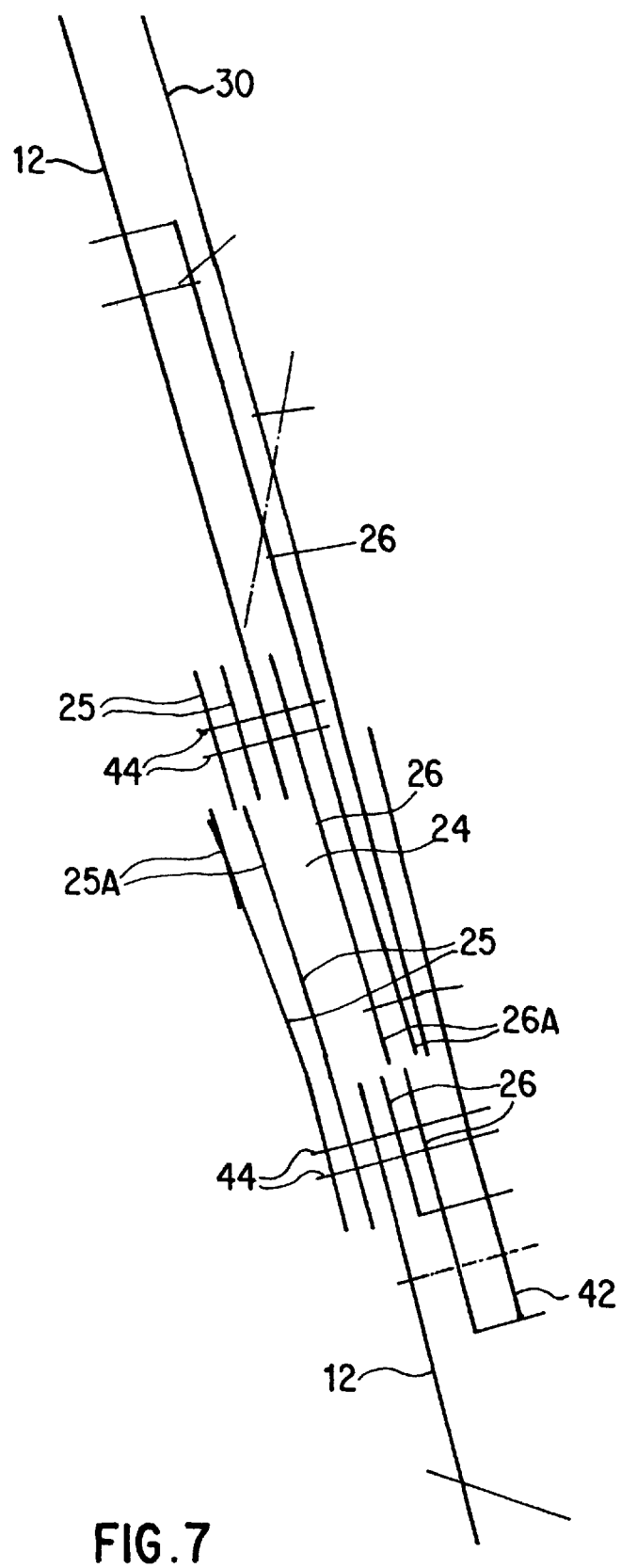
FIG. 7 is a schematic sectional view taken along line VII—VII of FIG. 6.

In the vicinity of gas generator 4, the adjacent fabric layer 12 of gas bag 5 is provided internally and externally with two pairs of reinforcing layers 25, 26 adjacent each other (see FIGS. 6–7). The reinforcing layers 25, 26 are connected with the centrally received fabric layer 12 by double seams 44. The inner reinforcing layers are labeled 25 and the outer reinforcing layers are labeled 26. In the vicinity of the installation opening 24 for the gas generator 4, free-cut pivotable flap areas 25A, 26A (see FIG. 7) are formed on reinforcing layers 25, 26. The flap areas 25A, 26A are used to close installation opening 24 following insertion of the gas generator 4. The flap sections 26A of the outer reinforcing layers 26 are permanently connected only at their upper edges with the fabric layer 12 and the inner reinforcing layers 25 adjacent the installation opening 24, while the flap sections 25A of the inner reinforcing layers 25 are connected only at their lower edges integrally with the fabric layer 12 and the inner reinforcing layers 25 (see FIG. 7). The flap sections are connected on the left and right edges of installation opening 24 with fabric layer 12. This arrangement produces a staggered overlapping of the flap sections following insertion of gas generator 4. FIG. 7 additionally shows a barcode label 42 (not shown in FIG. 6) which may be attached to the gas bag for purposes of inventory control.

After restraint 15 has been installed, threaded bolts 23 of generator support 22 are passed through matching circular recesses in fabric layer 12 and reinforcing layers 25, 26 and gas bag 5 is folded up. A protective sheath 30, likewise hung on threaded bolts 23 and connected at one end with gas bag 5, encloses the folded gas bag 5. Sheath 30 has a specified breaking point 31 which tears when gas bag 5 is inflated. Folded gas bag 5 with gas generator 4 inside is placed in housing 3, with threaded bolts 23 passing through openings in the adjacent housing 3. Nuts 32 are threaded from the outside onto the projecting threaded sections of threaded bolts 23.

The restraint 15 provided in thorax chamber 19 is made in two layers. In a partial area 33 of its lengthwise extent, restraint 15 is folded together to form a number of layers, with the stacked layers of restraint 15 being releasably connected to one another by a tear seam 34. Tear seam 34 is covered on both sides by external protective layers 35, 36, with the ends of the two protective layers 35, 36 facing gas generator 4 being sewn to restraint 15 (FIG. 3).

The end 17 of restraint 15 that faces occupant 2 is connected, with interposition of a rectangular internal reinforcing layer 37, to the external fabric layer 13 of the gas bag 5 that faces the occupant, with reinforcing layer 37 having a much greater width than restraint 15. Restraint 15 is guided between reinforcing layer 37 and fabric layer 13, with reinforcing layer 37 being connected with fabric layer 13 by two connecting seams all the way around. In lower chamber 19 and/or upper chamber 20 of gas bag 5, circular darts 38, 40 or tear seams can be provided between the two fabric layers 12, 13 of gas bag 5 for controlled inflation of the corresponding chamber 19, 20, with darts 38, 40 releasing when a predetermined internal pressure is exceeded. At partition 18 between both chambers 19 and 20, at least one through-flow opening 39 is provided through which the gas stream can flow into second chamber 20 after first chamber 19 is inflated.

Figure 3:
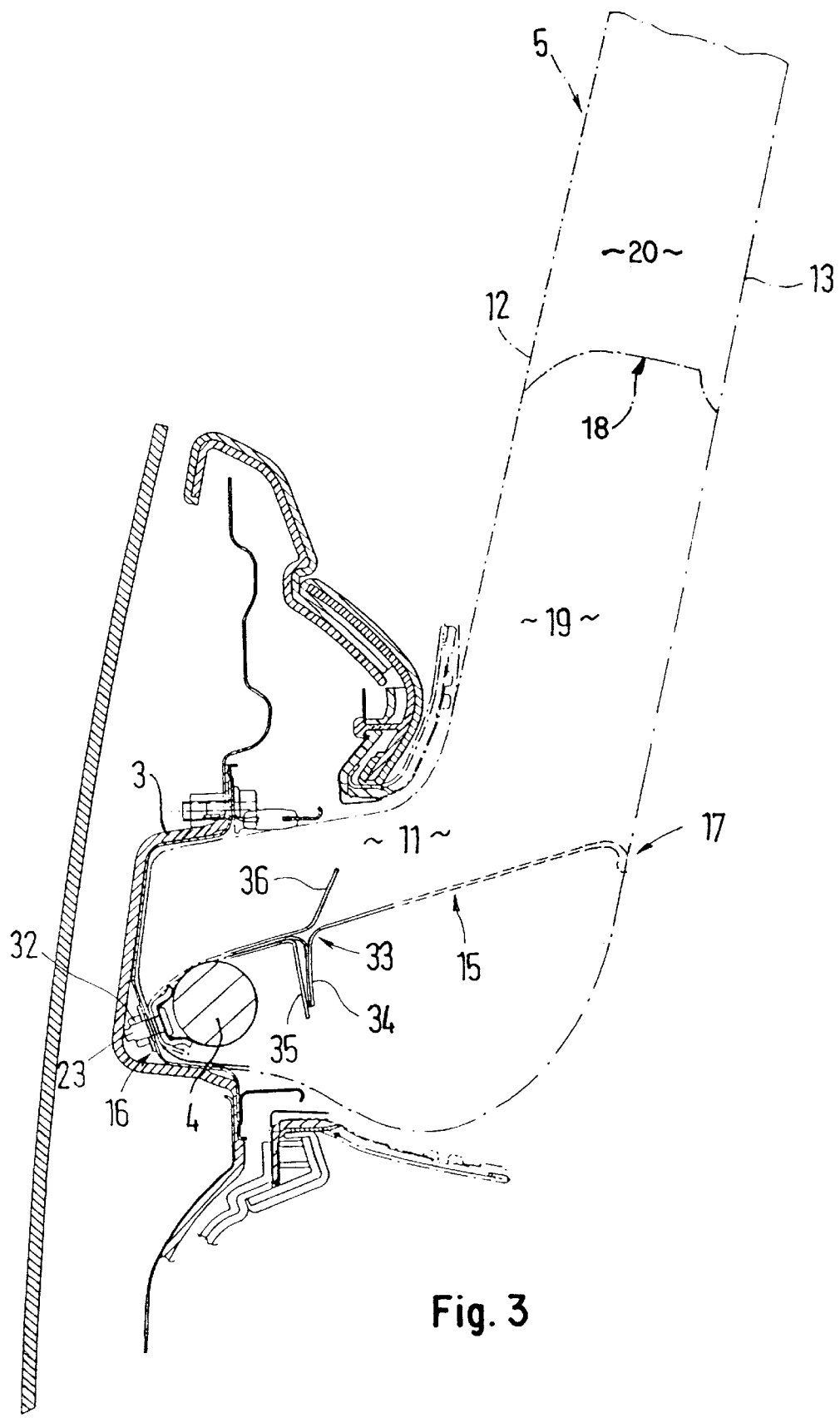
FIG. 3 is a section corresponding to FIG. 2 but with the gas bag partially unfolded.
Figure 4:
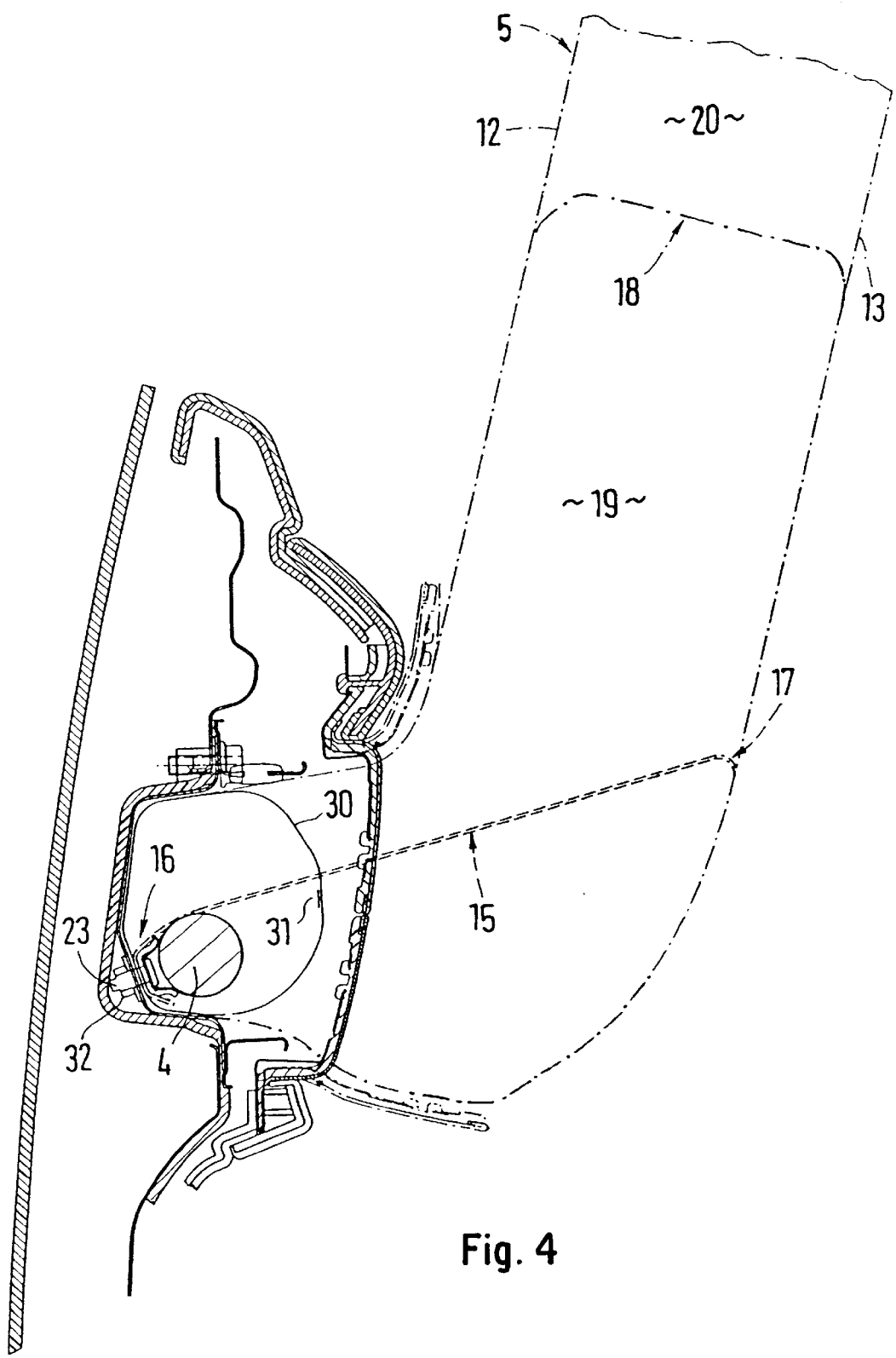
FIG. 4 is a section corresponding to FIG. 3 but with the gas bag fully unfolded.

When gas bag 5 inflates, lower chamber 19 is moved in the direction of the occupant while the travel and speed of gas bag 5 are reduced timewise by the sewn restraint 15 (see FIG. 3). Beginning at a certain internal pressure in first chamber 19, tear seam 34 of restraint 15 tears and first chamber 19 and gas bag 5 are moved further in the direction of occupant 2. With a time delay relative to first chamber 19, the second chamber 20 of gas bag 5 is inflated, said chamber being above first chamber 19 and associated with the head area of the occupant. Gas bag 5 according to the illustrated embodiment has no external outflow openings.

The foregoing disclosure has been set forth merely to illustrate the invention and is not intended to be limiting Since modifications of the disclosed embodiments incorporating the spirit and substance of the invention may occur to persons skilled in the art, the invention should be construed to include everything within the scope of the appended claims and equivalents thereof.

What is claimed is:

1. A side impact protection device for an occupant of a vehicle, comprising:
   a housing,
   a gas bag having an upper chamber operable in use to support a vehicle occupant head region and a lower chamber operable in use to support a vehicle occupant thoracic region, said upper and lower chambers being separated by a partition,
   an elongate tubular gas generator arranged within said lower chamber of the gas bag, and
   an internal restraint provided within the lower chamber of said gas bag, a first end of the restraint being attached to a portion of the gas bag which will face the occupant of the vehicle in an installed position, said internal restraint including a tear seam operable to control inflation of the lower chamber of the gas bag,
   wherein said gas generator, a second end of said restraint, and said gas bag are all coupled together to said housing via fasteners.

2. An impact protection device according to claim 1, wherein said restraint comprises two layers.

3. An impact protection device according to claim 1, wherein at least a portion of said restraint is folded into several layers, said layers being releasably connected with one another via the tear seam.

4. An impact protection device according to claim 3, wherein said restraint is provided at least in an area of said tear seam with external protective layers.

5. An impact protection device according to claim 1, wherein said first end of the restraint is interposed between an internal reinforcing layer and a first fabric layer of said gas bag in order to couple said first end to said first fabric layer, said internal reinforcing layer having a greater width than said restraint.

6. An impact protection device according to claim 1, wherein an elongate generator support is provided for holding said gas generator, said support having said fasteners in the form of projecting threaded bolts on a side facing away from the generator.

7. An impact protection device according to claim 1, wherein said gas bag includes a first fabric layer which will face the occupant in an installed position and a second fabric layer which will face away from the occupant in the installed position, said second fabric layer defining an installation opening for insertion of said gas generator into the gas bag, an internal reinforcing layer and an external reinforcing layer being provided on said second fabric layer at said installation opening, said internal and external reinforcing layers including flap sections which are movable into an overlapping position to close said installation opening.

8. An impact protection device according to claim 1, wherein said gas bag includes a first fabric layer and second fabric layer joined to said first fabric layer, at least one dart or tear seam being provided in the lower chamber joining the first and second fabric layers together, said dart tearing above a specific pressure inside said lower chamber.

9. An impact protection device according to claim 8, wherein at least one dart or tear seam is provided in said upper chamber to control unfolding or the gas bag.

10. An impact protection device according to claim 1, wherein said gas bag includes a first fabric layer and a second fabric layer joined to said first fabric layer, said restraint being secured by a mounting seam to said second fabric layer of the gas bag proximate a mount for the gas generator.

11. An impact protection device according to claim 1, wherein said gas generator is mounted on a generator support, said fasteners including a plurality of bolts provided on said generator support, said bolts being received in corresponding openings in said housing with said second end of the restraint and said gas being interposed between said gas generator and said housing.

12. An impact protection device according to claim 11, wherein said second end of the restraint and said gas bag each define holes for receiving said bolts.

13. A method of making a side impact protection device for an occupant of a vehicle which includes:

a housing, a gas bag having an upper chamber operable in use to support a vehicle occupant head region and a lower chamber operable in use to support a vehicle occupant thoracic region, said upper and lower chambers being separated by a partition, an elongate tubular gas generator arranged within said lower chamber of the gas bag, and an internal restraint provided within the lower chamber of said gas bag, a first end of the restraint being attached to a portion of the gas bag which will face the occupant of the vehicle in an installed position, said internal restraint including a tear seam operable to control inflation of the lower chamber of the gas bag, wherein said gas generator, a second end of said restraint, and said gas bag are all coupled together to said housing via fasteners, said method comprising inserting the gas generator into said lower chamber, and fastening the second end of said restraint and said gas bag to said housing with said fasteners.

14. A method according to claim 13, wherein said gas generator is mounted on a generator support, said fasteners including a plurality of bolts provided on said generator support, said bolts being received in corresponding openings in said housing with said second end of the restraint and said gas bag being interposed between said gas generator and said housing.

15. A method according to claim 14, wherein said second end of the restraint and said gas bag each define holes for receiving said bolts.

* * * * *